United States Patent [19]

Beliveau

[11] 3,839,063

[45] Oct. 1, 1974

[54] PROCESSING OF ANATASE TIO2 OBTAINED FROM THE CHLORIDE PROCESS

[75] Inventor: Thomas Joseph Beliveau, Newark, Del.

[73] Assignee: E. I. du Pont de Nemours and Company, Wilmington, Del.

[22] Filed: Feb. 12, 1973

[21] Appl. No.: 332,029

[52] U.S. Cl. .............................. 106/300, 423/613
[51] Int. Cl. ............................................. C09c 1/36
[58] Field of Search ................... 106/300; 423/613

[56] References Cited
UNITED STATES PATENTS 3,556,828  1/1971  Durrant et al. .................. 106/300
3,567,478  3/1971  Dietz ................................ 106/300

Primary Examiner—Delbert E. Gantz
Assistant Examiner—J. V. Howard

[57] ABSTRACT

Anatase $TiO_2$ pigments obtained from the "chloride" process involving the vapor phase oxidation of titanium tetrachloride are formed into slurries with water and with $TiCl_4$ or HCl to give a pH of 1.0 to 1.5. There is a reduced tendency for the slurries to thicken, i.e., when being held in storage or transported from one location to another.

10 Claims, No Drawings

PROCESSING OF ANATASE TIO2 OBTAINED FROM THE CHLORIDE PROCESS

BACKGROUND OF THE INVENTION

In the manufacture of $TiO_2$ pigments by the vapor phase oxidation of titanium tetrachloride it is frequently advantageous to calcine the pigment in a kiln to remove occluded chloride ion before further stages of processing take place, e.g., before dry milling with organic amines or other dispersents. In some instances the economics or the logistics of available equipment dictate that the $TiO_2$ must be initially collected in the form of an aqueous slurry which can then be conveyed to the kiln. In the case of the collection of rutile chloride-$TiO_2$ pigments, the slurries can be prepared and handled without any undue complications, i.e., the slurries retain adequate stability over many hours or even days. It has been found, however, that in the case of anatase chloride-$TiO_2$ pigments a severe and unexplainable thickening of such slurries can tend to occur after relatively short periods of time. This in turn gives rise to serious difficulties in pumping the slurries from one area to another and in holding the slurries for storage. While it would be possible to merely effect a dilution of such a slurry to the point where it would be again pumpable, this would be disadvantageous in that it would subsequently reduce the operating efficiency of the kiln, i.e., a much greater quantity of water would have to be volatilized.

SUMMARY OF THE INVENTION

The present invention relates to the treatment of anatase titanium dioxide pigment obtained from the vapor phase oxidation of titanium tetrachloride, in particular to a treatment wherein the pigment obtained from the oxidation reactor is combined with water in an amount to produce an aqueous slurry of at least 300 grams titanium dioxide pigment per liter and with titanium tetrachloride or hydrochloric acid in an amount sufficient to provide a slurry pH of 1.0 to 1.5. It has been found that slurries so produced have a remarkably reduced tendency to thicken on standing or during transportation. This means that they can be produced with higher solids contents than would otherwise be the case, and this is a substantial economic benefit where, for example, the slurry is to be subsequently calcined.

DETAILED DESCRIPTION

The present invention utilizes anatase pigments obtained by the vapor phase oxidation of $TiCl_4$. There are numerous patents describing the production of such pigments using anatase promoters (or rutile inhibitors) which may be incorporated in small amounts in the $TiCl_4$ stream to be co-oxidized and to serve in increasing the level of the anatase crystal content in the final product. The use of $SiCl_4$ is frequently mentioned for its value as an anatase promoter (e.g., see Frey U.S. Pat. No. 2,980,509) when oxidized along with $TiCl_4$.

An especially valuable technique for the production of anatase $TiO_2$ via the chloride process is that described in copending application Ser. No. 283,768, filed Aug. 25, 1972, to A. H. Angerman and C. G. Moore. According thereto a combination of a silicon halide, such as $SiCl_4$, and a phosphorus halide, such as $PCl_3$, is used for co-oxidation along with $TiCl_4$ to increase the percentage of anatase in the product. The utilization of the combination makes it possible to reduce the total quantity of the additives and this serves to maintain optical and other properties at a maximum. In a typical embodiment according thereto, the oxidation of $TiCl_4$ is carried out in the presence of amounts of a silicon halide and a phosphorus halide sufficient to provide in the resultant pigment 0.25 to 1.5 weight percent of oxidized silicon halide, calculated as $SiO_2$, and 0.05 to 1 weight percent of oxidized phosphorus halide, calculated as $P_2O_5$. Further details concerning other aspects of the vapor phase oxidation of $TiCl_4$ are given in said aforementioned U.S. application Ser. No. 283,768, the disclosure of which is incorporated herein by reference.

Regardless of the technique employed to produce the anatase chloride-$TiO_2$ pigment it can then be treated, preferably directly and without intervening processing steps, to form an aqueous slurry in accordance with the practice of the present invention. For this purpose the $TiO_2$ pigment can be collected dry and then transferred to any suitable mixing vessel to be combined with water and titanium tetrachloride and/or hydrochloric acid in amounts thereby forming a pH of 1.0 to 1.5. Alternatively it is also possible to initially collect the $TiO_2$ pigment directly as a so-called "reactor discharge" or "cyclone discharge" by a wet procedure in which the particles are directly introduced into an aqueous medium. The medium may, if desired, be one to which a predetermined amount of titanium tetrachloride or hydrochloric acid has already been added, e.g., to insure that when a given solids content is established the slurry will have a pH in the range of 1.0 to 1.5. Agitation is, in any event, typically needed to produce a homogeneous dispersion of particles in the aqueous medium, although the presence of the $TiCl_4$ or HCl can help to wet the pigment and improve the ease of dispersion. It will be apparent that a wide variety of techniques can be visualized for physically effecting a combination of water, $TiO_2$ pigment and titanium tetrachloride and/or hydrochloric acid; the main requirement being that the aqueous slurry as finally produced be composed of at least 300 grams anatase chloride-$TiO_2$ pigment per liter and contain titanium tetrachloride and/or hydrochloric acid in an amount sufficient to provide a slurry pH of 1.0 to 1.5.

As a general rule the practice of the present invention is of particular benefit when producing slurries having the highest possible levels of titanium dioxide solids. This is particularly so when using $TiCl_4$ to regulate the pH of the slurry. Usually it is desirable to produce slurries containing at least 300, and preferably at least 400, grams of the anatase chloride-$TiO_2$ pigment per liter but most often it is advantageous to produce slurries containing on the order of 600 to 1200 grams anatase chloride-$TiO_2$ pigment per liter. While occasionally it is possible to produce slurries having such amounts of more than 1200 grams per liter, in practice the viscosities become so high that it is difficult to handle the slurries without utmost difficulty. Also, while $TiCl_4$ is highly advantageous in reducing thickening of slurries over the entire range of solids contents up to 1200 grams per liter and more, HCl tends to lose its effectiveness when the amount of anatase chloride-$TiO_2$ pigment is in excess of about 1,100 grams per liter.

In the production of titanium dioxide pigments by the vapor phase oxidation of titanium tetrachloride it is common for the $TiO_2$ particles to exhibit a relatively acidic character because of residual chloride therein. In general such pigments will, depending on the nature of the anatase promoter or promoters and upon the ratio of moles $TiCl_4$:moles oxygen fed to the reactor, demonstrate pH values in aqueous slurry form on the order of 1.6 to 2.5 or even higher but this can vary on the amount of dilution. The lower the acidity of the initial particles the more titanium tetrachloride and/or hydrochloric acid will be required to achieve a slurry pH of 1.0 to 1.5. For example, when using a combination $SiCl_4$ and $PCl_3$ as co-oxidants, the latter results in $P_2O_5$ which tends to give a more acidic pigment, hence less $TiCl_4$ and/or HCl will have to be added to the slurry. If $SiCl_4$ is the sole co-oxidant, the pigment is initially much less acidic and more $TiCl_4$ and/or HCl will have to be added to the slurry.

In any event a preferred pH range for the slurry is 1.1 to 1.4, but most often optimum stability characteristics are obtained, and this will be apparent from the data set forth in the examples hereinafter, when the pH value is in the range of 1.2 to 1.4. In the case where titanium tetrachloride is the material employed to regulate the pH of the slurry, it will be typically used in amounts on the order of 0.1 to 0.4 percent, preferably 0.1 to 0.2 percent calculated as $TiO_2$, and based on the weight of the anatase chloride-$TiO_2$ pigment in the slurry.

It is entirely practical for the slurry so obtained to be composed essentially of anatase chloride-$TiO_2$ pigment, water and $TiCl_4$ and/or HCl. It is also possible, however, to introduce at this stage certain other additives, for example, additives that may influence the properties of the pigment in some subsequent stage. The incorporation of small amounts of potassium ion in the slurry can be beneficial, for example, in increasing the dispersibility of the $TiO_2$ pigment after it has been calcined in the presence of a source of phosphate ion and thereafter dry milled with an amine dispersant. Such a procedure is described in my copending U.S. application Ser. No. 158,513, filed June 30, 1971.

As indicated hereinbefore, the present invention is particularly advantageous when it is desired to calcine the anatase chloride-$TiO_2$ pigment and for one reason or another it is necessary that the pigment be in slurry form when fed to the kiln where calcining takes places. Regardless of the reason, however, such a calcining step will be advantageously carried out at a temperature of about 500° to about 1,050°C., typically for at least one-half hour or more, in order to eliminate moisture and chloride ion. The fact that the pigment particles have been exposed to highly acidic conditions using $TiCl_4$ and/or HCl has been found not to result in any discernible physical property differences once calcining has taken place. After the calcining step is concluded, the pigment may then be subjected to further conventional processing steps. For example, it will be normally advantageous to dry mill the pigment, for example, in a fluid energy mill of the known type.

It will be understood that when reference is made in the present specification and the appended claims to the use of titanium tetrachloride to form slurries of anatase chloride-$TiO_2$ pigment, the titanium tetrachloride may be directly added as such in liquid or vapor form or, as is frequently more convenient, in the form of an aqueous solution. In the case of aqueous solutions the titanium tetrachloride can hydrolyze to some extent, resulting for instance in some form of titanium oxychloride derivative, but this does not alter its effectiveness. Hence in this sense the use of the term "titanium tetrachloride" herein as an additive for the slurry is to be construed as embracing the use of such $TiCl_4$ hydrolyzates as well.

The following examples will serve to further illustrate the invention. Parts and percentages therein are by weight unless otherwise indicated. Moreover, the percentages are expressed in relation to the quantity of anatase $TiO_2$ pigment which is treated or otherwise involved.

In the examples pigment viscosity data indicates Brookfield viscosity measurements made on slurries at 25°C., 100 rpm, using the No. 3 spindle for values up to 1,000 centipoises and the appropriate spindle for centipoise values in excess thereof.

EXAMPLE 1

$TiCl_4$ is oxidized with oxygen in the vapor phase using a tubular foraminous wall reactor as disclosed in Kruse U.S. Pat. No. 3,203,763 to produce a predominantly anatase pigment. $SiCl_4$ and $PCl_3$ are added to the $TiCl_4$ stream prior to injection into the reactor at rates sufficient to give approximately 0.7% $SiO_2$ and 0.3% $P_2O_5$ in the resultant product. Chlorine gas as a coolant is constantly passed through the foraminous reactor walls. The $TiO_2$ product stream leaving the reactor is quenched with chlorine, cooled in water-cooled flues and collected.

Portions of the $TiO_2$ product are formed into aqueous slurries having concentrations as indicated in the Table below. In forming each slurry the pigment is added to tap water while stirring with a Lightnin laboratory mixer. Then $TiCl_4$ is added to the slurry by dropwise addition of an aqueous $TiCl_4$ solution having a concentration equivalent to 225 grams $TiO_2$ per liter of solution. Subsequently mixing is continued for 15 minutes and the initial viscosity measurement then made. Further viscosity measurements are made after the slurries are held in storage for 24 hours and for 7 days.

As is apparent from the Table, the Control sample with no $TiCl_4$ having been added to the slurry becomes exceedingly viscous after only 24 hours. The remaining samples remain adequately stable after even 7 days, hence can be pumped without further dilution to a kiln for calcining, typically at 500° to 1,050°C., to volatilize the water and occluded chloride ion. In the course of such calcining, the added $TiCl_4$ is converted to $TiO_2$ as chloride is driven off.

EXAMPLE 2

The procedure of Example 1 is followed employing an anatase $TiO_2$ pigment of essentially identical composition but obtained from another oxidation run. The results are given in the Table.

Again it is apparent that the use of the $TiCl_4$ remarkably enhances the stability of the slurries. The only exception is that with a very high solids content slurry of 1,200 grams $TiO_2$ per liter (Samples 2-G, 2-H and 2-I) the amount of $TiCl_4$ must be more judiciously selected to maintain a minimum degree of thickening. Even in the case of Sample 2-I the actual increase in viscosity on standing is considerably less than the corresponding Control.

EXAMPLE 3

The procedure of Example 2 is followed but employing hydrochloric acid in lieu of $TiCl_4$. In this case concentrated HCl of about 35 percent strength is employed and it is added dropwise until the indicated pH is attained. The results are again given in the Table.

The results demonstrate that HCl is also effective at the 1050 grams $TiO_2$ per liter level but not to the same extent as $TiCl_4$.

EXAMPLE 4

The procedure of Examples 2 and 3 are followed but in this case a high shear mixer, a Cowles Dissolver operated at 2,400 rpm, is substituted for the Lightnin mixer. With Samples 4-A and 4-C the pH adjustment is made with concentrated hydrochloric acid. With Samples 4-B and 4-D the pH adjustment is made with aqueous $TiCl_4$ solution. Results are given in the Table.

Again it will be seen that $TiCl_4$ is the preferred additive and that the HCl is only effective at the 1050 grams $TiO_2$ per liter level.

EXAMPLE 5

A predominantly anatase chloride-$TiO_2$ pigment is produced as in Example 1 except that the $SiO_2$ level is varied between 0.5 and 0.65 percent. Also the pigment from the oxidizer, after passing though flue coolers, is collected by a cyclone and bag filter arrangement to separate solids from gas, and then is conveyed directly to a slurry tank.

Water is constantly mixed with the pigment to produce a slurry while liquid $TiCl_4$ is atomized therein from a spray nozzle located below the surface of the slurry. Portions of the slurry are constantly withdrawn and cycled to a kiln to be calcined at 800° to 850°C.

During the run, which lasts about 32 hours, the amount of water employed is sufficient to maintain a slurry concentration of about 950 to 1,050 grams of anatase chloride-$TiO_2$ pigment per liter. The amount of $TiCl_4$ introduced is sufficient to provide 0.15 percent thereof, calculated as $TiO_2$. The pH of the slurry throughout the run is maintained in the range of 1.2 to 1.3.

No noticeable thickening of the slurry occurs during the run. Moreover when portions are stored and examined several weeks later there is again no noticeable thickening which has occurred.

What is claimed is:

1. In a process for the production of anatase titanium dioxide pigment by the vapor phase oxidation of titanium tetrachloride, the improvement wherein the pigment obtained from the oxidation reactor is combined with water in an amount to produce an aqueous slurry of at least 300 grams titanium dioxide pigment per liter and with titanium tetrachloride or hydrochloric acid in an amount sufficient to provide a slurry pH of 1.0 to 1.5.

2. Process according to claim 1 wherein the pH is 1.1 to 1.4.

3. Process according to claim 1 wherein the pH is 1.2 to 1.4.

4. Process according to claim 1 wherein the slurry is provided with titanium tetrachloride in the amount of 0.1 to 0.4 percent, calculated as $TiO_2$ and based on the weight of said anatase titanium dioxide pigment in the slurry.

5. Process according to claim 1 wherein the slurry is provided with titanium tetrachloride in the amount of 0.1 to 0.2 percent, calculated as $TiO_2$ and based on the weight of said anatase titanium dioxide pigment in the slurry.

6. Process according to claim 1 wherein the slurry contains at least 400 grams anatase titanium dioxide pigment per liter.

7. Process according to claim 1 wherein the slurry contains 600 to 1,200 grams anatase titanium dioxide pigment per liter.

8. Process according to claim 1 wherein the anatase titanium dioxide pigment is produced by effecting the vapor phase oxidation of titanium tetrachloride in the presence of minor amounts of silicon tetrachloride and phosphorus trichloride.

9. Process according to claim 1 wherein the slurry is thereafter calcined at a temperature of 500°C. to 1,050°C. to remove occluded chloride ion and water.

10. An aqueous-based slurry containing anatase titanium dioxide pigment obtained from the vapor phase oxidation of titanium tetrachloride, said slurry being stable against excessive thickening upon storage and being produced by the process of claim 1.

* * * * *

TABLE

| Example | Sample | Anatase $TiO_2$ (grams/liter) | Final Slurry pH | % $TiCl_4$ Addition (as $TiO_2$) | Brookfield Viscosity — CPS | | |
|---|---|---|---|---|---|---|---|
| | | | | | Initial | 24 Hrs. | 7 Days |
| 1 | Control | 900 | 1.9 | 0.0 | 194 | 4720 | — |
| | 1-A | 900 | 1.4 | 0.14 | 227 | 249 | 385 |
| | 1-B | 900 | 1.25 | 0.18 | 261 | 270 | 328 |
| | 1-C | 900 | 1.05 | 0.34 | 428 | 408 | 445 |
| 2 | Control | 900 | 1.8 | 0.0 | 140 | 372 | >1000 |
| | 2-A | 900 | 1.39 | 0.1 | 204 | 219 | 255 |
| | 2-B | 900 | 1.25 | 0.12 | 201 | 212 | 243 |
| | 2-C | 900 | 1.1 | 0.29 | 350 | 349 | 376 |
| | Control | 1050 | 1.65 | 0.0 | 258 | — | 1388 |
| | 2-D | 1050 | 1.4 | 0.07 | 385 | — | 498 |
| | 2-E | 1050 | 1.24 | 0.12 | 464 | — | 471 |
| | 2-F | 1050 | 1.1 | 0.2 | 619 | — | 675 |
| | Control | 1200 | 1.6 | 0.0 | 466 | — | 1042 |
| | 2-G | 1200 | 1.33 | 0.06 | 590 | — | 817 |
| | 2-H | 1200 | 1.2 | 0.1 | 723 | — | 859 |
| | 2-I | 1200 | 1.1 | 0.16 | 885 | — | 1148 |
| 3 | 3-A | 1050 | 1.4 | 0.0 | 269 | — | 1150 |
| | 3-B | 1050 | 1.2 | 0.0 | 437 | — | 812 |
| | 3-C | 1050 | 1.1 | 0.0 | 629 | — | 886 |
| | 3-D | 1200 | 1.41 | 0.0 | 667 | — | 1346 |
| | 3-E | 1200 | 1.27 | 0.0 | 934 | — | 1340 |
| 4 | 4-A | 1050 | 1.19 | 0.0 | 365 | — | 623 |
| | 4-B | 1050 | 1.18 | 0.1 | 333 | — | 445 |
| | 4-C | 1200 | 1.2 | 0.0 | 465 | — | 1182 |
| | 4-D | 1200 | 1.2 | 0.04 | 554 | — | 780 |